United States Patent [19]

Conway

[11] 4,262,437
[45] Apr. 21, 1981

[54] DISPLAY AND KIT THEREFOR

[76] Inventor: Gerald A. Conway, 3133 Fairfax Rd., Cleveland Heights, Ohio 44118

[21] Appl. No.: 957,075

[22] Filed: Nov. 2, 1978

[51] Int. Cl.³ .............................................. G09F 17/00
[52] U.S. Cl. ..................................... 40/604; 40/10 R
[58] Field of Search ................. 40/604, 584, 606, 607, 40/10 R

[56] References Cited

U.S. PATENT DOCUMENTS

| 2,882,629 | 4/1959 | Moebius | 40/607 |
| 3,500,789 | 3/1970 | Keats | 40/604 |
| 4,009,532 | 3/1977 | Thomas | 40/606 |

FOREIGN PATENT DOCUMENTS

| 1377009 | 9/1964 | France | 40/10 R |
| 561943 | 3/1957 | Italy | 40/607 |

Primary Examiner—Gene Mancene
Assistant Examiner—Wenceslao J. Contreras
Attorney, Agent, or Firm—Maky, Renner, Otto & Boisselle

[57] ABSTRACT

A poster display and kit therefor provides an inexpensive point-of-sale advertising poster, with stiffening ribs which hold opposite vertical edges of the poster planar thereby preventing rolling or curling. Two telescoping sections with a rubber band stop provide an adjustable vertical pole support for the poster which may be attached thereto with adhesive strip. The pole of the poster display is held in an upright position by securing it to a cardboard, corrugated cut-case, or wire merchandising display using one or more specialized straps which encircle the lower pole section and hold the same to the cardboard merchandise container with an arrowhead tab, gummed plate, or, when the same is attached to a wire merchandising display or stand, by looping the strap around both the pole and a wire element of the display. The poster display kit, when disassembled into its component parts, may be packed for storage or shipping into the larger of the telescoping pole sections.

9 Claims, 8 Drawing Figures

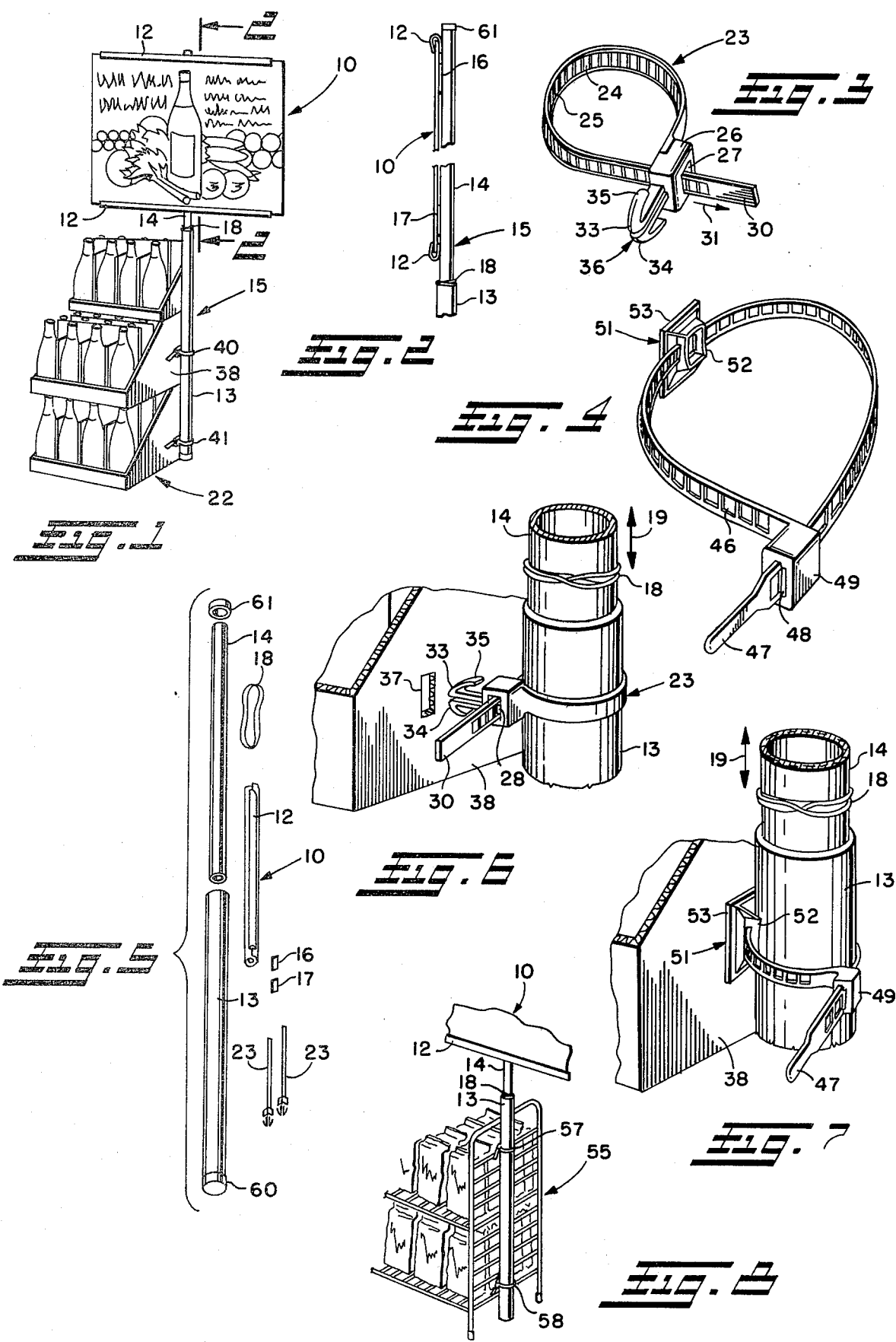

DISPLAY AND KIT THEREFOR

BACKGROUND OF THE INVENTION

This invention relates generally to a poster display and to a kit therefor, useful for retail or point-of-sale advertising such as in grocery, drug or discount stores.

Conventionally, such advertising displays consist merely of posters which the merchant displays by whatever means he finds most convenient, such as taping the same to walls, shelves, etc. Obviously, if secured to a shelf, the display may block valuable shelf display space. Another conventional display employs a one-piece stand of metal which has a base, support pole and frame at the top thereof. The frame is slotted for accepting display posters.

Accordingly, merchants advertising select products must tape display posters on walls or shelves, when possible, or alternatively, transport the products to an area where a metal stand may be employed. In some instances, it is neither possible nor desirable to attach advertising materials to walls or shelves by adhesives or the like nor to transfer goods to a location where a stand can be used.

Also, some consumer goods manufacturers supply wire, metal or corrugated feet with a display that takes up valuable floor space. It is therefore important to have a display which utilizes essentially no floor space.

SUMMARY OF THE INVENTION

It is therefore a principal object of the present invention to provide a selfcontained poster display.

A further important object is to provide a poster display which does not require wall attachment.

Another important object is to provide a pole-supported advertising poster which can be used with a display constructed of cardboard, wire or other merchandise container.

Still another important object is to provide an inexpensive disposable poster display.

A further object is to provide a highly simple, inexpensive, easy to assemble kit for such poster display.

Yet another object is to provide such display wherein one section of the pole may be used as a compact shipping container for the kit or for storage of unused poster displays.

A still further object is the provision of a display and kit therefor which is contained in a double wall tube for ease of packaging, shipping or mailing.

Other objects and advantages of the present invention will become apparent as the following description proceeds.

To the accomplishment of the foregoing, the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

In the annexed drawings:

FIG. 1 is a perspective view of an assembled poster display in accordance with the present invention;

FIG. 2 is a fragmentary broken section taken along the line 2—2 of FIG. 1;

FIG. 3 is an enlarged view of one form of a strap useful with cardboard box displays;

FIG. 4 is a perspective view of another form of strap using an adhesive securing plate;

FIG. 5 is a perspective view of the components of the poster display kit;

FIG. 6 is an enlarged perspective view, partially broken away, of the vertical support pole of the display about to be attached, with an arrowhead tab strap as shown in FIG. 2, to a carboard box display;

FIG. 7 is a similar perspective partially broken away of the pole attached to a cardboard display with a strap as shown in FIG. 4; and FIG. 8 is a fragmentary perspective of the display poster of the present invention secured to a free-standing wire display.

Description of the Preferred Embodiments

Referring now in detail to the drawings and particularly to FIG. 1 wherein an assembled kit for a poster display is depicted, a poster 10 is held planar for facile reading by top and bottom stiffening ribs 12. Depending on the material of the poster, the bottom rib may sometimes be omitted. The stiffening ribs 12 are constructed of U-shape relatively stiff extruded plastic material and have opposing spring flanges which grip the poster edge therebetween. The stiffening ribs may be slid or threaded on the poster edge. The poster 10 is held upright by telescoping pole sections 13 and 14 forming pole 15 and is attached thereto by double-sided adhesive strips 16 and 17 as depicted in FIG. 2. The telescoping pole 15 is height adjustable so as to accommodate the differing height requirements of various size advertising posters. Such adjustability is accomplished with snugly fitting telescoping pole sections as depicted in FIGS. 6, 7 and 8, with the smaller section 14 retained at the desired height using a rubber band stop 18 which grips the smaller telescoping pole section 14 and abuts the upper edge of the larger telescoping pole section 13.

The rubber band stop 18 may be placed on the smaller section simply by double or more twisting around such section and then rolling it to the desired location. With the stop in place the pole 15 may be formed by inserting the smaller section in the top of the larger as indicated by arrow 19 until the stop engages the top of the larger section as seen in FIG. 6. The pole sections may be formed of spiral wrapped paper tubing in conventional manner and may be color coordinated with the advertising poster or the packaging of the merchandise being displayed.

The assembled poster display may be attached to a corrugated cardboard or cut-case merchandising display 22, which has at least one vertical side, with straps 23 as depicted in FIGS. 3 and 6. The straps 23 are formed of flexible plastic material such as polyethylene polypropylene and have on one side a series of recesses 24 formed between transverse ribs 25. At one end of the strap 23 is integrally formed a locking housing 26 which has a slot 27 therein accommodating the opposite end. A flexible tang or tooth shown at 28 in FIG. 6 is provided in the locking housing projecting toward the free end 30 which spring snaps over the ridges as the free end is pulled in the direction of arrow 31. Accordingly, the loop formed by the strap may be constricted by pulling the free end of the strap, but it will not move in the opposite direction. The tang in the lock housing acts as a ratchet pawl. Such locking straps are generally conventional.

However, as seen more clearly in FIGS. 3 and 6, the locking housing may be provided with flexible projections 33 and 34 extending from the opposite side of the strap. Each projection includes a rearwardly extending curved flange 35 and such projections together form an arrow head projection 36 designed to snap through slot 37 which may readily be cut in corrugated cardboard box 38 forming part of the merchandise display 22. The straps are simply looped about the lower section of the pole, pulled fairly tight, and then the arrow head projections are inserted through the slots in the corrugated containers, as seen at 40 and 41 in FIG. 1. In a three container display as seen in FIG. 1, the pole is preferably attached to only the lower two containers.

In FIGS. 4 and 7 there is illustrated another type of strap 45 which may be used with corrugated cardboard or other planar surface containers. The major extent of the strap is provided with square or rectangular apertures 46 and the free end is provided with a threading head 47 to enable it to be threaded through slot 48 in locking housing 49. A flexible tang or tooth in the housing projecting toward the free end enables the strap to be pulled to constrict the loop thus formed but will not permit it to expand. Before forming the loop an adhesive plate 51 is threaded on the strap with the flat adhesive surface thereof facing outwardly. The plate is provided with a suitable inwardly extending square projection 52, two sides of which are slotted to receive the strap therethrough as indicated. The adhesive 53 on the planar surface of the plate may be protected with a peel-off layer before application to the side of a container as seen in FIG. 7. In this manner, a slot or hole need not be formed in the side of the container.

If the poster is to be used in conjunction with a wire display stand as seen in FIG. 8 at 55, plastic loop of either type may be employed and the arrow head tab and adhesive plate simply become redundant. The lower section of the pole is simply placed adjacent the side of the stand in a vertical position and the loops placed therearound and around suitable horizontal or vertical elements of the wire stand as seen at 57 and 58. The loops are then pulled snug. The upper section of the pole is placed in the top of the lower section to the extent permitted by the rubber band stop and the poster is secured to the upper section.

Now referring to FIG. 5, the components of the kit for the poster are illustrated. The lower larger pole section 13 has a closed bottom indicated at 60 and a removable top or cap seen at 61. When closed, the lower section 13 forms the shipping container or package for the entire kit. The smaller upper pole section 14 readily completely telescopes within the section 13. Contained within the upper pole section 13 are the rubber band stop 18, one or more posters 10 with the stiffening ribs 12 already threaded thereon, the two double sided adhesive elements or strips 16 and 17, and two or more securing loops or straps 23 which may be of either type illustrated. Like the adhesive plate, the strips or elements 16 and 17 may be protected with a peel-off layer or they may be preassembled to the poster before packaging.

To form the poster from the kit, the merchant simply removes the cap 61 and the kit components. The lower pole section 13 is secured to the merchandise display as seen in FIGS. 6, 7 or 8 by means of the straps provided. The rubber band stop is then placed on the upper pole section at the desired position and the upper pole section is inserted in the top of the lower section. The stop should be far enough from the bottom of the upper section to provide stability for the pole when thus assembled. The poster may then be reversely rolled to remove its tendency to curl or re-roll and the poster is secured to the upper section using the double sided adhesive elements 16 and 17. Extra or additional posters may be stored in the pole until required. The cap 61 may be placed on the top of the upper pole section 14 simply as an appearance cover.

When the poster no longer serves its purpose, it may be thrown out or disposed of, or alternatively the pole may be reused with other posters. The poster display may also be disassembled and conveniently stored for reuse in its container 13. In such event new or additional securing straps must normally be provided because the old straps usually must be cut to remove the pole from the merchandise display. However, because of the inexpensive nature of the poster display this may not be economically feasible.

It can now be seen that there is provided an inexpensive poster display for point-of-sale advertising which can readily be formed from a kit and secured to a merchandise display.

Other modes of applying the principle of the invention may be employed, change being made as regards the details described, provided the features stated in any of the following claims or the equivalent of such be employed.

I claim:

1. A poster display comprising a multiple section telescoping pole, means to secure said pole in an upright position to an adjacent structure, and a poster secured to the top section of the pole, said poster including at least one stiffening rib to hold the same in planar condition, and said means to secure comprising a loop forming strap means adapted to encircle the lower section of the pole and to secure the same to an adjacent structure to hold the pole in said upright position.

2. A poster display as set forth in claim 1 including a stop on a smaller of said sections of said telescoping pole limiting the extent of telescoping into a larger of said sections of said pole.

3. A poster display as set forth in claim 2 wherein said stop is a rubber band twisted about said smaller section.

4. A poster display as set forth in claim 4 including means on said strap to secure the strap and thus the pole to such adjacent structure.

5. A poster display as set forth in claim 4 wherein said last mentioned means comprises an arrow head projection on the locking housing adapted to project through and lock within a slot in such adjacent structure.

6. A poster display as set forth in claim 4 wherein said last mentioned means comprises a planar adhesive plate threaded on the strap.

7. A poster display comprising a multiple section telescoping pole, a poster secured to the top section of the pole, said poster including at least one stiffening rib to hold the same in planar condition, loop forming strap means adapted to encircle the lower section of the pole and secure the same to an adjacent structure to hold the pole in upright position, wherein said strap means includes a locking housing through which the free end of the strap may be inserted to form and tighten said loop about said lower section of said pole.

8. A poster display comprising a poster support pole, a poster secured to the top section of the pole, said poster including at least one stiffening rib to hold the same in planar condition, loop forming strap means adapted to encircle the lower section of the pole and secure the same to an adjacent structure to hold the pole in upright position, wherein said means includes a locking housing through which the free end of the strap may be inserted to form and tighten said loop about said lower section of said pole.

9. A poster display as set forth in claim 8 wherein adhesive means secure said poster to said top section of said e.

* * * * *